United States Patent [19]

Rambaud

[11] Patent Number: 4,730,810
[45] Date of Patent: Mar. 15, 1988

[54] PROTECTIVE BARRIER AGAINST FALLS OF STONES

[75] Inventor: Pascal Rambaud, Le Russey, France

[73] Assignee: Mecanroc, Mirmande, France

[21] Appl. No.: 817,575

[22] Filed: Jan. 10, 1986

[30] Foreign Application Priority Data

Jan. 14, 1985 [FR] France ............................. 85 00452

[51] Int. Cl.$^4$ ............................. E01F 7/04; B64F 1/02
[52] U.S. Cl. ................................. 256/12.5; 256/1; 256/23; 256/25; 256/35; 244/110 C; 244/110 F
[58] Field of Search .................. 256/12.5–23; 244/110 C, 110 F; 188/65.1, 65.4

[56] References Cited

U.S. PATENT DOCUMENTS

| 1,451,493 | 4/1923 | Cruickshank . | |
|---|---|---|---|
| 2,265,698 | 12/1941 | Opgenorth | 256/13.1 |
| 2,465,936 | 3/1949 | Schultz | 244/110 C |
| 3,087,584 | 4/1963 | Jackson et al. | 188/1 |
| 3,211,260 | 10/1965 | Jackson | 188/1 |
| 3,383,076 | 5/1968 | Van Zelm et al. | 244/110 |
| 3,738,599 | 6/1973 | Borehag | 244/110 C |
| 3,750,612 | 8/1973 | D Agostino | 188/65.4 X |
| 4,039,045 | 8/1977 | Hoger | 188/65.4 |

FOREIGN PATENT DOCUMENTS

| 246765 | 5/1966 | Austria . | |
|---|---|---|---|
| 1459804 | 5/1969 | Fed. Rep. of Germany | 256/12.5 |
| 2803860 | 8/1979 | Fed. Rep. of Germany | 256/12.5 |
| 2414586 | 8/1979 | France . | |
| 2522051 | 8/1983 | France | 256/12.5 |
| 1303218 | 1/1973 | United Kingdom . | |

OTHER PUBLICATIONS

G. Verrier: "Protection des voies ferrées contre les chutes de rochers", Travaux, No. 547, Sep. 1980, pp. 32–39, éditions Science et Industrie, Paris, FR.

Primary Examiner—Randolph A. Reese
Assistant Examiner—John A. Ricci
Attorney, Agent, or Firm—Young & Thompson

[57] ABSTRACT

The protective barrier comprises a sheet of netting substantially following the ground transverse to the slope and held spread out upright by posts. The posts are held by upstream and downstream stays on a guide in the direction of the slope, the guide being formed by a loop of cable stretched between two pulleys anchored in the ground and having a bearing strand to which the stays and the post are attached. A mooring cable upstream of the netting retains the attachment place of the upstream stay on the bearing strand. The cable is equipped with shock-absorbing means adapted to allow a length of reserve cable to run when subjected to strong tension. The impact of blocks of stones causes the posts to fall back on either side of the place of impact, the motion being slowed down by the shock-absorbing means. The sheet of netting remains stretched and the posts do not bend.

13 Claims, 11 Drawing Figures

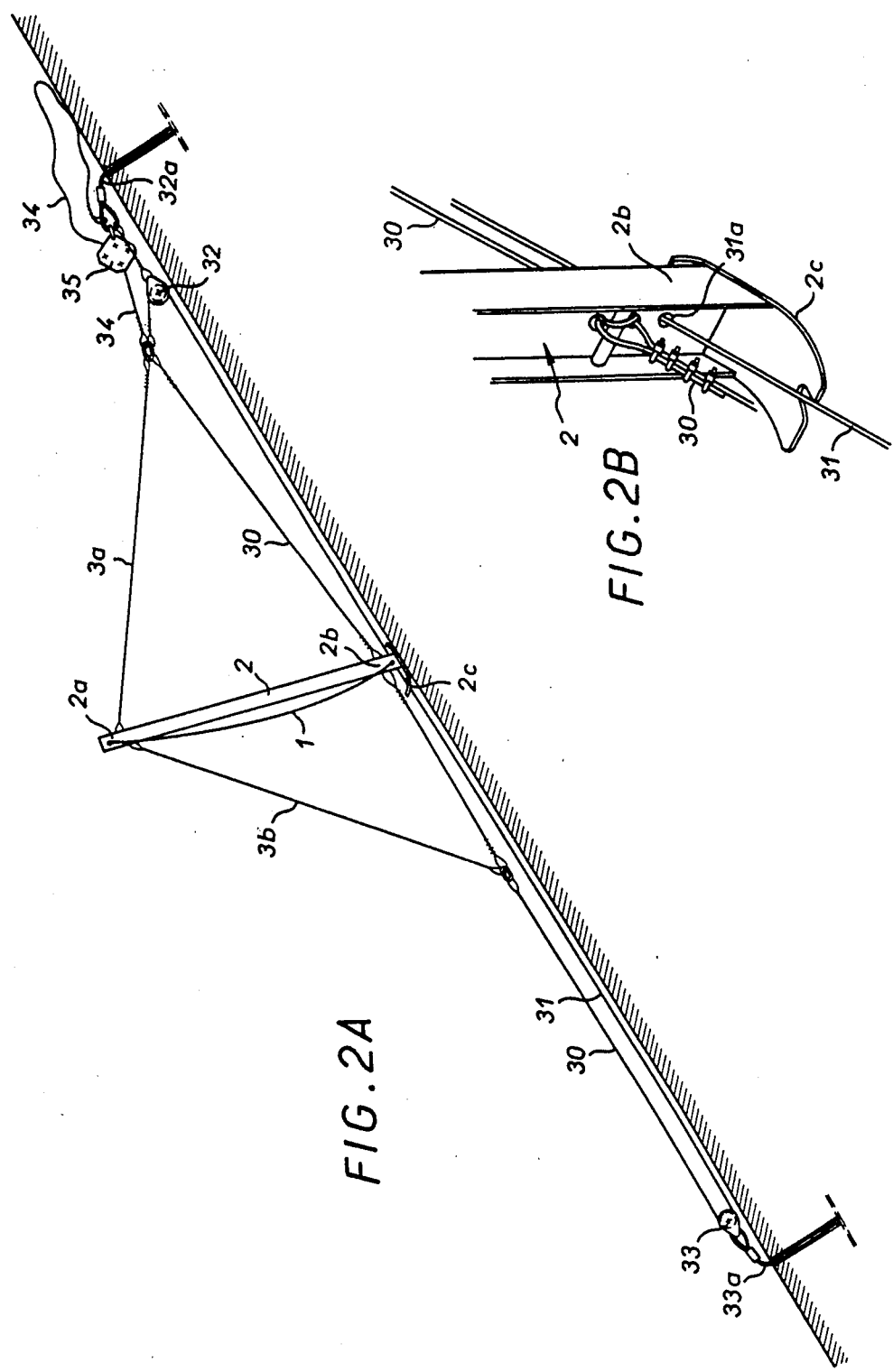

PROTECTIVE BARRIER AGAINST FALLS OF STONES

BACKGROUND TO THE INVENTION

1. Field of Invention

The invention relates to a protective barrier against falls of stones on sloping ground, comprising at least one sheet of netting or other suitable material substantially following the ground traverse to the slope and held spread out upright by rigid posts and retained at least upstream by mooring cables disposed in line with the posts and connected to anchorages, the cables comprising shock-absorbing means adapted to supply a length of reserve cable in response to a tensile force exceeding a set value.

2. Description of Prior Art

There have been numerous descriptions and material embodiments of protective barriers against falling stones, comprising a grid or net stretched on posts across the anticipated path of the stones along sloping ground. The main difficulty of this kind of barrier is to maintain protection after the impact of large blocks. It is of course economically impracticable to dispose barriers, walls, or brackets upstream of the places to be protected and capable under all circumstances of stopping the largest blocks which may fall down the upstream slopes, without the need to overhaul the protective obstacles. A first step towards a solution is to use netting or a mesh network which distributes the energy of impact over regions adjacent the actual place of impact. However, particularly when the impact occurs near a post, the forces resulting from the impact are concentrated on the post, which is subject to forces pulling it over downstream. Heavy impacts will cause the post to bend or break near its base, which is set in the ground. One idea has been to use springs to attach a sheet of netting to posts, to reduce the abruptness of impacts. However, the reduction is limited owing to the small amount by which the springs can stretch. Also, springs do not absorb the energy of impact and there may be dangerous rebounds.

French patent application No. 2 414 586 describes a protective safety barrier, inter alia against falling stones, which comprises a mesh screen held stretched by cross-members, with respect to which the network is enabled to move by connecting means of limited strength extending between the screen and the places where it is anchored and retained. The connecting means are cables forming stays and extending through apertures at the top and bottom of the posts or cross-members and connected to upstream anchorages. The cables have tension-limiting devices adapted to allow portions of reserve cable to run between jaws which are adjustably tightened to define a resistance threshold.

The side cables of the mesh screen may comprise tension limiters of the same kind suitably adjusted.

During the impact of a large block, the tension limiters yield, the energy of impact being used up in friction by the cables in the tension limiters. The screen moves away from the posts by an amount equal to the length of yielded stay, and tends to close again in a pocket around the block, since the stay portions which have run in the post apertures enable the edges to come together to a certain extent.

This kind of barrier has been found effective but still has some drawbacks. If a large block directly strikes a post, the post will bend or break and the barrier will collapse downstream and thus become completely ineffective at the place where the post was struck. Furthermore, repeated impacts in a localized area cause the edges of the mesh screen to come together behind the accumulated blocks and reduce the effective height of the screen, with the risk of forming a reverse-gradient slope which can be crossed by stones subsequently falling down the slope.

SUMMARY OF THE INVENTION

The present invention provides a protective barrier against falls of stones on sloping ground, comprising at least one sheet of netting or other material substantially following the ground transverse to the slope and held spread out upright by rigid posts and retained at least upstream by mooring cables disposed in line with the posts and connected to anchorages, the cables having shodk-absorbing means adapted to supply a length of reserve cable in response to a tensile force exceeding a set value, in which the sheet is connected to the posts at least at the top and bottom and each post is held erect by a group of stays connected to a guide means adapted to move along the slope, a mooring cable and shock-absorbing means being coupled via the guide in order to retain the post.

Thus, irrespective of the places of impact or the effects of earlier impacts, the struck part of the barrier can fall back owing to the release of cable by shock-absorbing means which absorb the energy of impact without substantially affecting the orientation of vertical stretching of the sheet.

Preferably, the guide means comprises a closed cable loop extending over guide pulleys at the upstream and downstream end of the guide means, the loop having a return strand and having a bearing strand attached to the stays and the base of the upright.

Preferably also, the barrier is connected at each end by top and bottom tensioners to a mooring cable equipped with shock-absorbing means, corresponding anchoring means being disposed substantially in line with the sheet. By means of this feature, the posts are held upright or substantially vertical and subjected to lateral stresses in the general direction of the sheet, although the posts have some freedom to move in the direction of the sheet to compensate the displacement of posts along the slope.

In a preferred embodiment, the shock-absorbing means comprises at least three sheaves having grooves adapted to receive the cable and held flat between two plates, the cable extending in a winding path defined on either side by running through the grooves.

The stiffness of the cable tends to press it into the grooves of the sheaves, which are intimately followed by the winds of the cable. Consequently, tension on the cable increases the grip in the grooves and consequently increases the shock-absorption by friction of the cable in the grooves. Note that the braking force increases with the tensile force and depends on the winding of the cable in the shock-absorbing means, so that the shock absorption is nearer to viscous absorption than to friction absorption between solids as with prior-art shock-absorbers, which are difficult to set initially and easily come out of adjustment.

BRIEF DESCRIPTION OF THE DRAWINGS

The invention will be described further, by way of example, with reference to the accompanying drawings, in which:

FIG. 2A shows a post in the barrier with a guide means ad a shock-absorbing means;

FIG. 2B shows a detail of the base of the post;

DETAILED DESCRIPTION OF PREFERRED EMBODIMENT

Figure 1:
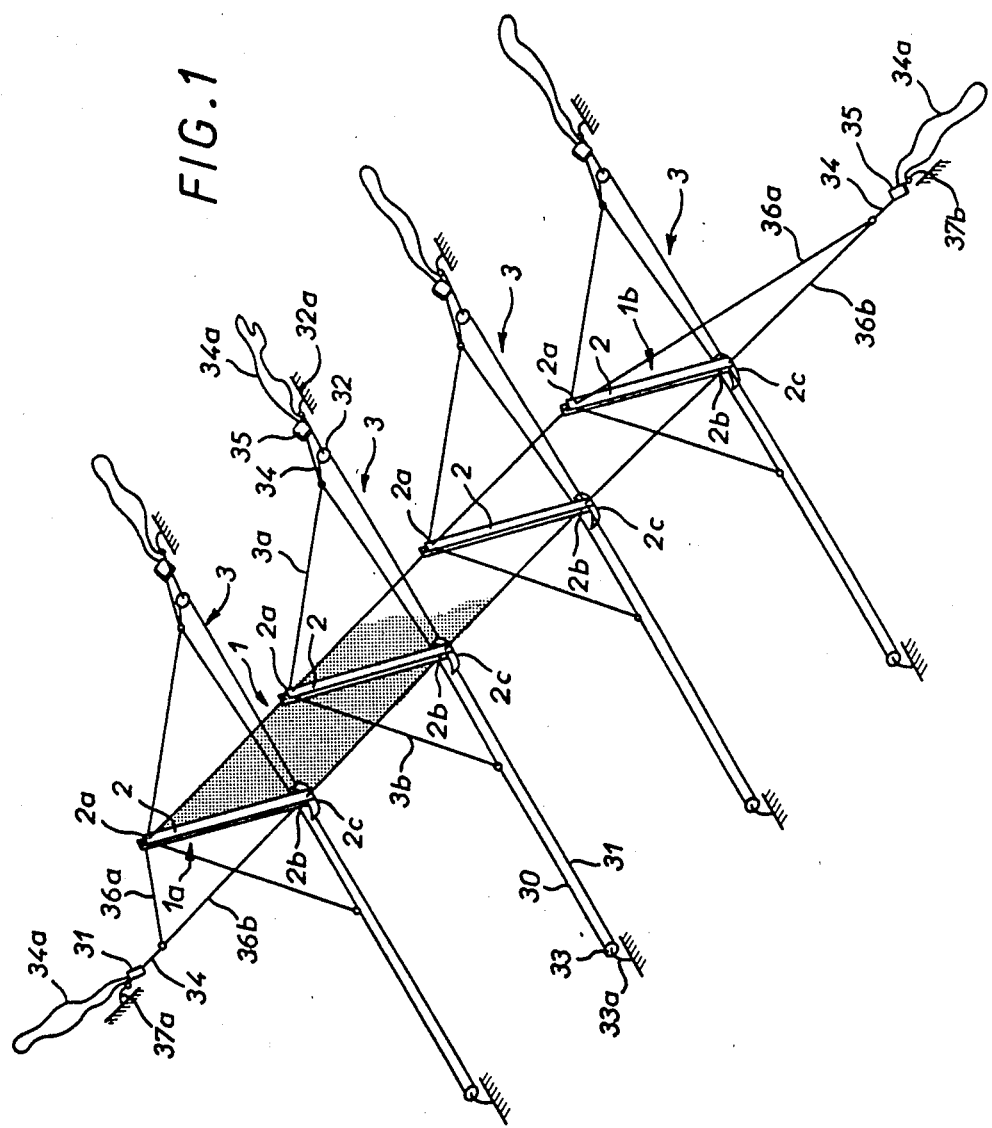
FIG. 1 is a perspective view of a barrier according to the invention.

In the embodiment shown in FIG. 1, the protective barrier comprises a sheet of netting 1 stretched along the ground substantially perpendicular to the slope and held stretched by posts or uprights 2. As shown more clearly in FIG. 2A, the sheet 1 is held at its top and bottom edges at the top 2a and bottom 2b of each upright 2. At its base, each upright 2 has a shoe 2c adapted to slide along a track formed down the slope. Each upright 2 is held erect by two stays, i.e. an upstream stay 3a and a downstream stay 3b, both stays 3a and 3b together with the base 2b of the upright 2 being secured to a bearing strand 30 of a loop of cable closed by return strand 31 and running over upstream and downstream pulleys 32, 33 secured to respective anchorages 32a, 33a with blocks concreted into the ground. The strands 30, 31 and pulleys 32, 33 form a guide means for the post 2.

Of course, the anchorages 32a, 33a are constructed by a method appropriate to the nature or consistency of the ground. Frequently use is made of the "exploded pile" technique, in which a tube a few centimeters in diameter is lowered into a drilled hole of corresponding diameter and an explosive charge is detonated in the tube to expand it and form a chamber in the ground. The chamber is then filled with concrete, after which an anchor brace is inserted and projects beyond the end of the tube above the ground.

A mooring cable 34 is secured to the place where the upstream stay 3a is secured to the bearing strand 30. The cable 24 extends through a shock-absorbing means 35 connected to the upstream anchorage 32a. After travelling through the means 35, the cable 34 forms a loose reverse loop 34a whose end is held in the anchorage 32a.

As shown more clearly in FIG. 2B, the shoe 2c comprises a sole of thick sheet metal having raised edges. The return strand 31 extends through an aperture 31a formed in the base 2b of the upright 2 and through notches in the ends of the shoe 2c.

Returning to FIG. 1, the two ends 1a, 1b of sheet 1 terminate at uprights 2 each having two tensioners, i.e. a top tensioner 36a and a bottom tensioner 36b, both connected to a mooring cable 34 with a shock-absorbing means 35 and a reserve loop 34a. These shock-absorbing means are secured to respective anchorages 37a, 37b disposed substantially in line with the sheet 1.

The shock-absorbing means will be described in greater detail with reference to FIGS. 3 and 4. As stated, the sliding of the cable 34 under tension is slowed down by friction. When abrupt tension is exerted on the cable 34, a length of reserve loop 34a is yielded via the shock-absorbing means 35 and the tension energy is dissipated by friction of the cable 34 in the means 35.

When the barrier is set up, the cables 34 are stretched and form reserve loops 34a of maximum length. The sheet 1 is then positioned, stretched at ends 1a, 1b by the tensioners 36a and 36b and held in the most upstream position possible, substantially perpendicular to the slope, by uprights 2 held erect by stays 3a and 3b.

Of course, the ends 1a and 1b of the sheet are disposed beyond any possible trajectory of stones. A number of sheets can be disposed in succession if the danger area is wider than the length of a single sheet.

When a large block of stone strikes the sheet 1 at any place between its ends 1a and 1b, forces are transmitted to the top and bottom of the uprights 2 adjacent the struck portion of sheet. In the case of each upright under tension, these forces are mainly transmitted to the cable 34 via the stay 3a and the bearing strand 30. Also, part of the force is transmitted via tensioners 36a, 36b to the corresponding cable 34.

When abrupt tension is exerted on the cables 34, the shock-absorbing means 35 yield a length of reserve loop 34a. In the case of guide means 3, the elongation of the stretched part of the cables 34 (taken from the reserve loop 34a) causes the bearing strand 30 to descend and the return strand 31 to rise correspondingly, the descent of the bearing strand being accompanied by a descent of the upright 2, although it remains substantially parallel to its original direction.

Of course, the descent of the uprights 2 adjacent the impact has a reduced effect on the other uprights nearby. Subsequent deformation of the sheet along the slope results in a certain elongation of the stretched parts of the cables 34 connected to the anchorages 37a, 37b.

If a large block directly strikes an upright 2, the upright will give way and descend downstream. There is practically no risk of breakage. Deformation of the uprights is greatly reduced.

During periodic overhauls or after a period of heavy falls of stone, the retained stones are removed and the barrier can usually be repaired simply by replacing the sheet 1 and shortening the stretched parts of the cables 34 to the maximum extent.

Figure 3A:
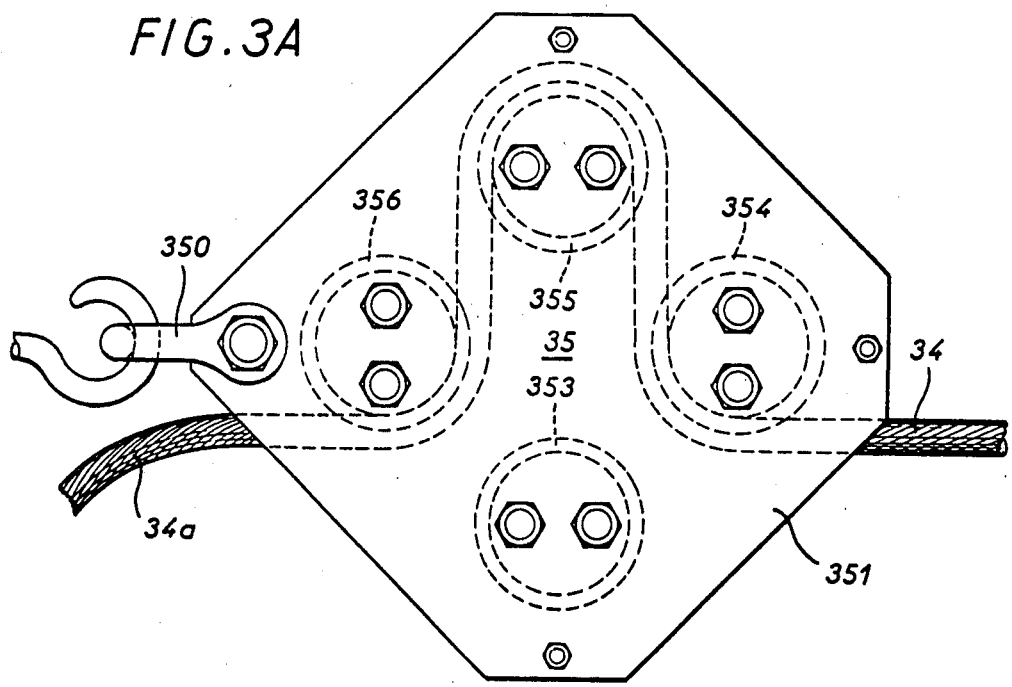
FIG. 3A is a plan view of a shock-absorbing means.
Figure 3B:
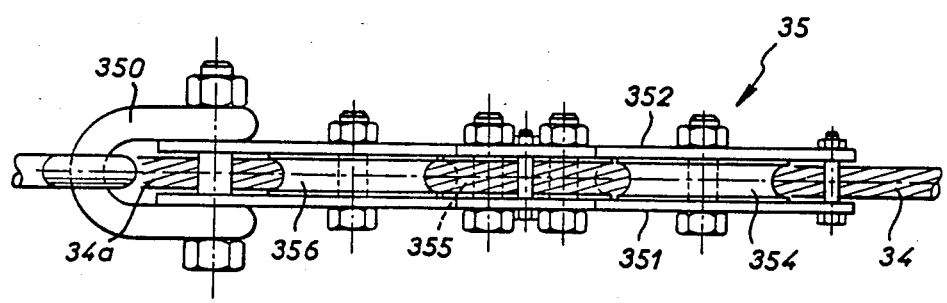
FIG. 3B is a cross-sectional view of the shock-absorbing means.

The shock-absorbing means 35 shown in FIGS. 3a and 3b comprises two flat plates 351 ad 352 between which four sheaves 353–356 are held flat, each sheave being secured by two bolts.

The four sheaves are centered on the corners of a square whose side is substantially three times the sheave radius. The grooves in the sheaves have a semicircular cross-section and the same radius as the cable 34. A coupling strap 350 is disposed in line with the axes of the sheaves 354 and 356 along an extension of a diagonal of the square. As shown more clearly in FIG. 3A, the cable 34 extends into the shock-absorbing along a sinuous path defined by passing through the grooves of sheaves 354, 355, and 356 in succession. Proceeding from the stretched part of cable 34 to the reserve loop 34a, with reference to FIG. 3A, sheaves 354 and 356 will be on the right of the cable whereas sheave 355 remains on the left. In this embodiment, the cable 34 is in contact with the sheaves over a length equal to one circumference of a sheave.

The statement that the side of the square, whose corners define the centers of the sheaves, is substantially three times the sheave radius means that the ratio of the side to the radius is between 2.7/1 and 3.4/1, corresponding to a range of approximately ±10%.

It can be seen that if sudden tension is exereted on cable 34 (from the opposite side from the coupling strap 350), the inertia and stiffness of the cable tend to hold it by friction in the grooves of the sheaves. The sheave 356 nearest the reserve loop 34a only has the aforementioned retaining effect due to inertia and stiffness. However, in the groove of sheave 355, the retaining tension of sheave 356 additionally clamps the cable into the groove (around a half-turn) and increases the braking retaining force, acting like a winch. The braking force in the groove of the top sheave 354 is also reinforced by braking in the subsequent sheaves.

As can be seen, if the shock-absorbing means comprised fewer than three sheaves the braking effect would not be guaranteed, since the cable would not necessarily follow a winding path since a straight line can always extend through two points. If there are three sheaves the number of different paths is very limited. As can be seen, however, by reference to FIGS. 4A to 4F, the number of different paths made possibly by using four sheaves becomes large and the length of groove arc followed is similarly varied. To sum up, the braking efficiency increases with the length of arc followed.

Note that the arc followed by the cable on the sheave where the reserve loop starts cannot be reliably taken into account since the reserve loop is loose and its shape is difficult to anticipated.

Figure 4A:
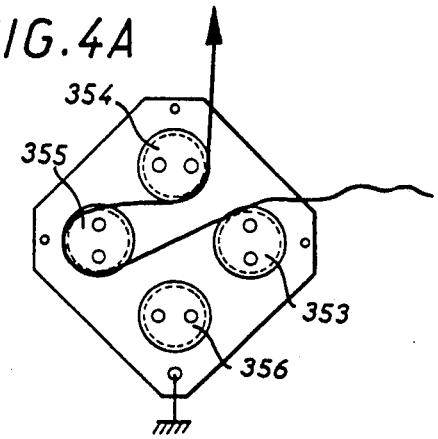
FIG. 4A–4F show various paths of the cable in a shock-absorbing means.

In FIG. 4A, the cable extends from the stretched part to the reserve loop over sheaves 354, 355, and 353, the angle gripped being about 315°.

Figure 4B:
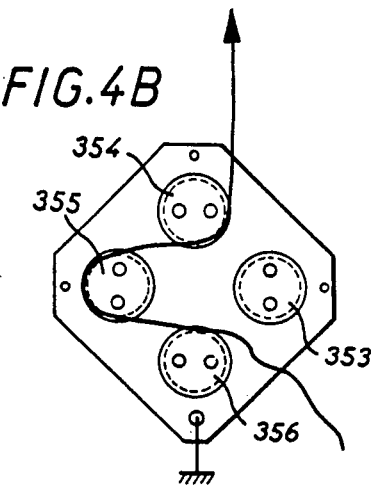

In FIG. 4B, the cable extends over sheaves 354, 355, 356, the angle gripped being 270°. Although the arrangement is similar to that in FIG. 3A, the arc gripped is reduced owing to the random initial orientation of the reserve loop.

Figure 4C:
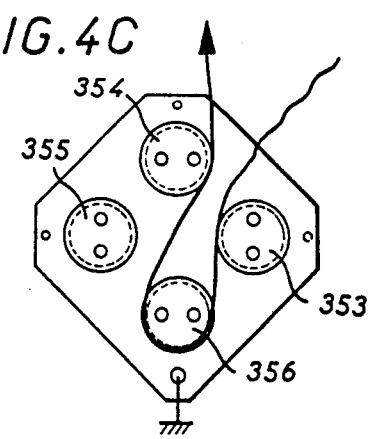

In FIG. 4C the order of the sheaves is 354, 356, 353, the arc gripped being about 270°.

Figure 4D:
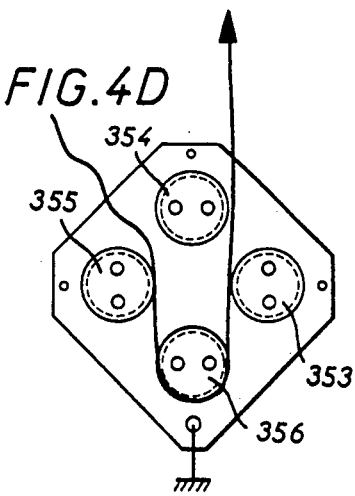

In FIG. 4D the order is 354, 356, 355. The angle gripped is 180°, since here the arc gripped on the top sheave 354 is zero because the cable extends on the same side of sheaves 354 and 356.

Figure 4E:
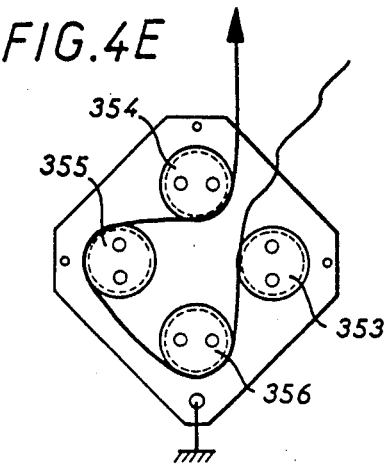

In FIG. 4E the order is 354, 355, 356, 353, the gripped arc being 360°.

Figure 4F:
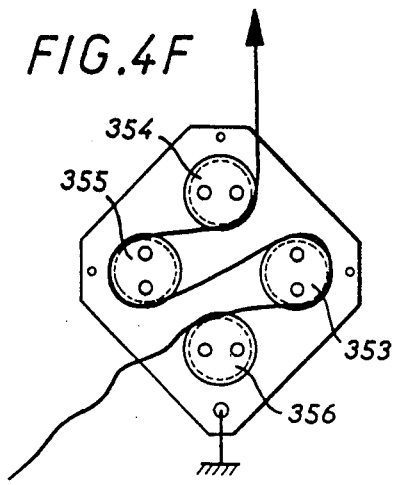

In FIG. 4F the order is 354, 355, 353, 356, the gripped arc being 495°.

As can be seen, this arrangement enables the braking force to be easily adjusted when the barrier is erected or overhauled. As can be seen, the efficiency of braking increases with the tensile force and the braking force under given tension will be relatively reproducible in contrast to the prior-art devices, where the braking force depends on the grip of jaws around a cable, which does not appreciably vary and may be disturbed by deformation of the cable or wear on the jaws.

The braking progressively increases with the tensile force and consequently with the speed with which the cable slides in the shock-absorbing means. The shock-absorbing means therefore behaves like a viscous shock-absorber. The value set for the tension force above which the cable slides in prior-art devices is not the main parameter of the shock-absorbing means. The shock-absorbing is the quantity which is adjusted by choosing the path of the cable in the shock-absorbing means.

As can be seen, the invention was designed to supply protection against falls of stones and has been described in connection with this application. However, it is of use for holding back any uncontrolled displacements of heavy objects such as logs, building materials or the like.

I claim:

1. A protective barrier against falls of stones on sloping ground, comprising at least one sheet of netting oriented substantially transversely to the slope, rigid posts holding the sheet spread out upright, mooring cables adapted to be disposed upslope of the sheet, the mooring cables being disposed in line with the posts and connected to anchorages, and shock-absorbing means associated with the respective mooring cables and adapted to supply a length of reserve cable in response to a tensile force exceeding a set value, the sheet being connected to the posts at least at their upper and lower ends, plural stays for holding each of said posts erect, each of said posts and its associated stays being coupled to guide means whichin turn is coupled to said mooring cable and to said shock-absorbing means, said posts being yieldably retained and movable downslope and along said guide means in response to a fall of stones.

2. A barrier as claimed in claim 1, in which each said guide means comprises a closed cable loop extending over guide pulleys at upslope and downslope ends of the guide means, the loop including a return strand and a bearing strand attached to the lower end of the corresponding post and its associated stays.

3. A barrier as claimed in claim 2, in which the plural stays comprise two stays secured to the upper end of the corresponding post and connected to the bearing strand upslope and downslope respectively of the lower end of said corresponding post.

4. A barrier as claimed in claim 2, in which each of the posts has a shoe adapted to slide along a track on the slope, the return strand of each closed cable loop extending through an aperture formed in the lower end of the corresponding post.

5. A barrier as claimed in claim 1, in which the sheet of netting is connected at each end by top and bottom tensioners to a further mooring cable with further shock-absorbing means and with further anchoring means disposed substantially in line with the sheet.

6. A barrier as claimed in claim 1, in which each of the shock-absorbing means comprises at least three sheaves having grooves adapted to receive the corresponding mooring cable extending in a sinuous path defined between said sheaves.

7. A barrier as claimed in claim 6, in which each of the shock-absorbing means has four sheaves, each of the four sheaves being centered at a different corner of an imaginary square, the corresponding shock-absorbing means having a place of attachment which lies on an extension of a diagonal of the square.

8. A barrier as claimed in claim 7, in which the ratio of the side of the imaginary square to the radius of the sheaves is between 2.7/1 and 3.4/1.

9. A protective barrier against falls of stones on sloping ground, comprising at least one sheet of netting oriented substantially transversely to the slope, rigid posts holding the sheet spread out upright, mooring cables disposed upslope of the sheet, the mooring cables being disposed in line with the posts and connected to anchorages, and shock-absorbing means associated with the respective mooring cables and adapted to supply a length of reserve cable in response to a tensile force exceeding a set value, the sheet being connected to the posts at least at their upper and lower ends, plural stays for holding each or said posts erect, guide means coupled to each of said posts and its associated stays, said guide means also being coupled to its associated mooring cable and shock absorbing means, said guide means being adapted to guide said posts downslope in response to a fall of stones while said posts remain erect.

10. A barrier as claimed in claim 9, in which each said guide means comprises a closed cable loop extending over guide pulleys at upslope and downslope ends of the guide means, the loop including a return strand and a bearing strand attached to the lower end of the corresponding post and its associated stays.

11. A barrier as claimed in claim 10, in which the plural stays comprise two stays secured to the upper end of the corresponding post and connected to the bearing strand upslope and downslope respectively of the lower end of said corresponding post.

12. A barrier as claimed in claim 10, in which each of the posts has a shoe adapted to slide along a track on the slope, the return strand of each closed cable loop extending through an aperture formed in the lower end of the corresponding post.

13. A barrier as claimed in claim 9, in which the sheet of netting is connected at each end by top and bottom tensioners to a further mooring cable with further shock-absorbing means and with further anchoring means disposed substantially in line with the sheet.

* * * * *